US012692887B2

(12) United States Patent
Rahman et al.

(10) Patent No.: US 12,692,887 B2
(45) Date of Patent: Jul. 28, 2026

(54) ANTI-PINCH COVER

(71) Applicant: HONEYWELL SAFETY PRODUCTS USA, INC., Charlotte, NC (US)

(72) Inventors: Ataur Rahman, Charlotte, NC (US); Prudhvi Krishna Yarlagadda, Charlotte, NC (US); Ravi Kumar Avupati, Charlotte, NC (US); Raviteja Tata, Charlotte, NC (US); Rizwan Ahmad, Charlotte, NC (US)

(73) Assignee: Honeywell Safety Products USA, Inc., Latham, NY (US)

( * ) Notice: Subject to any disclaimer, the term of this patent is extended or adjusted under 35 U.S.C. 154(b) by 1002 days.

(21) Appl. No.: 17/823,774

(22) Filed: Aug. 31, 2022

(65) Prior Publication Data

US 2023/0066654 A1     Mar. 2, 2023

(30) Foreign Application Priority Data

Sep. 2, 2021    (IN) .............................. 202111039753

(51) Int. Cl.
   F16B 7/10          (2006.01)
(52) U.S. Cl.
   CPC ................................... F16B 7/105 (2013.01)
(58) Field of Classification Search
   None
   See application file for complete search history.

(56) References Cited

U.S. PATENT DOCUMENTS

| | | | | |
|---|---|---|---|---|
| 3,572,834 A | * | 3/1971 | Herzer ................... | B60N 2/815 |
| | | | | 297/410 |
| 4,362,415 A | * | 12/1982 | Metz ......................... | F16B 7/10 |
| | | | | 403/328 |
| 4,406,559 A | * | 9/1983 | Geertsema ............... | B25G 3/18 |
| | | | | 403/287 |
| 5,462,380 A | * | 10/1995 | Peek ........................ | A61G 5/12 |
| | | | | 285/308 |
| 5,823,699 A | * | 10/1998 | Austin, Jr. .............. | F16D 1/096 |
| | | | | 403/368 |
| 6,749,227 B2 | * | 6/2004 | Margid ................ | A63C 11/221 |
| | | | | 280/823 |
| 8,192,107 B2 | * | 6/2012 | Solberg .................. | B60D 1/155 |
| | | | | 280/491.2 |
| 9,204,726 B2 | * | 12/2015 | Tseng ....................... | A47C 4/44 |
| 2005/0215958 A1 | * | 9/2005 | Hawthorne ........ | A61B 5/15003 |
| | | | | 604/227 |
| 2016/0023347 A1 | * | 1/2016 | Ho ......................... | F16B 7/1454 |
| | | | | 16/429 |

* cited by examiner

*Primary Examiner* — Daniel J Wiley
(74) *Attorney, Agent, or Firm* — Fredrikson & Byron, P.A.

(57)          ABSTRACT

A telescopic hot stick or pole for manipulating a tool from a position a selected distance away from a workpiece wherein the hot stick includes a tubular first section having a female end and a predetermined non-circular cross-sectional shape. A second section has a male end slidably engaged within the first tubular section and a predetermined non-circular cross-sectional shape conforming in a close-fit relation to the shape of the first section to prevent significant relative rotation of the second section therein. A locking assembly maintains the second section in an extended position where locking is accomplished in response to a sliding of the second section to the extended position and may be disengaged to permit ready removal of the second section from the first section.

20 Claims, 8 Drawing Sheets

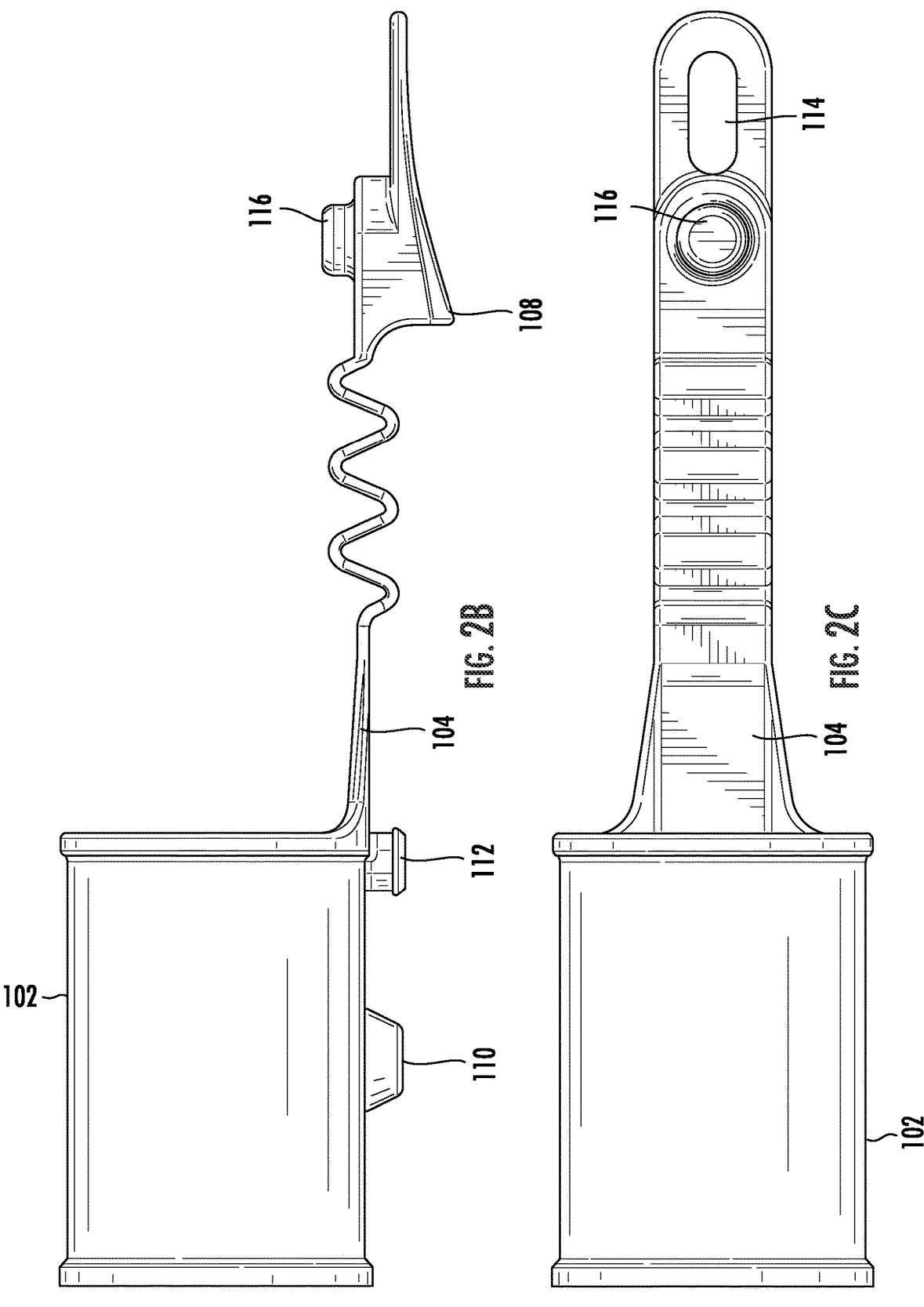

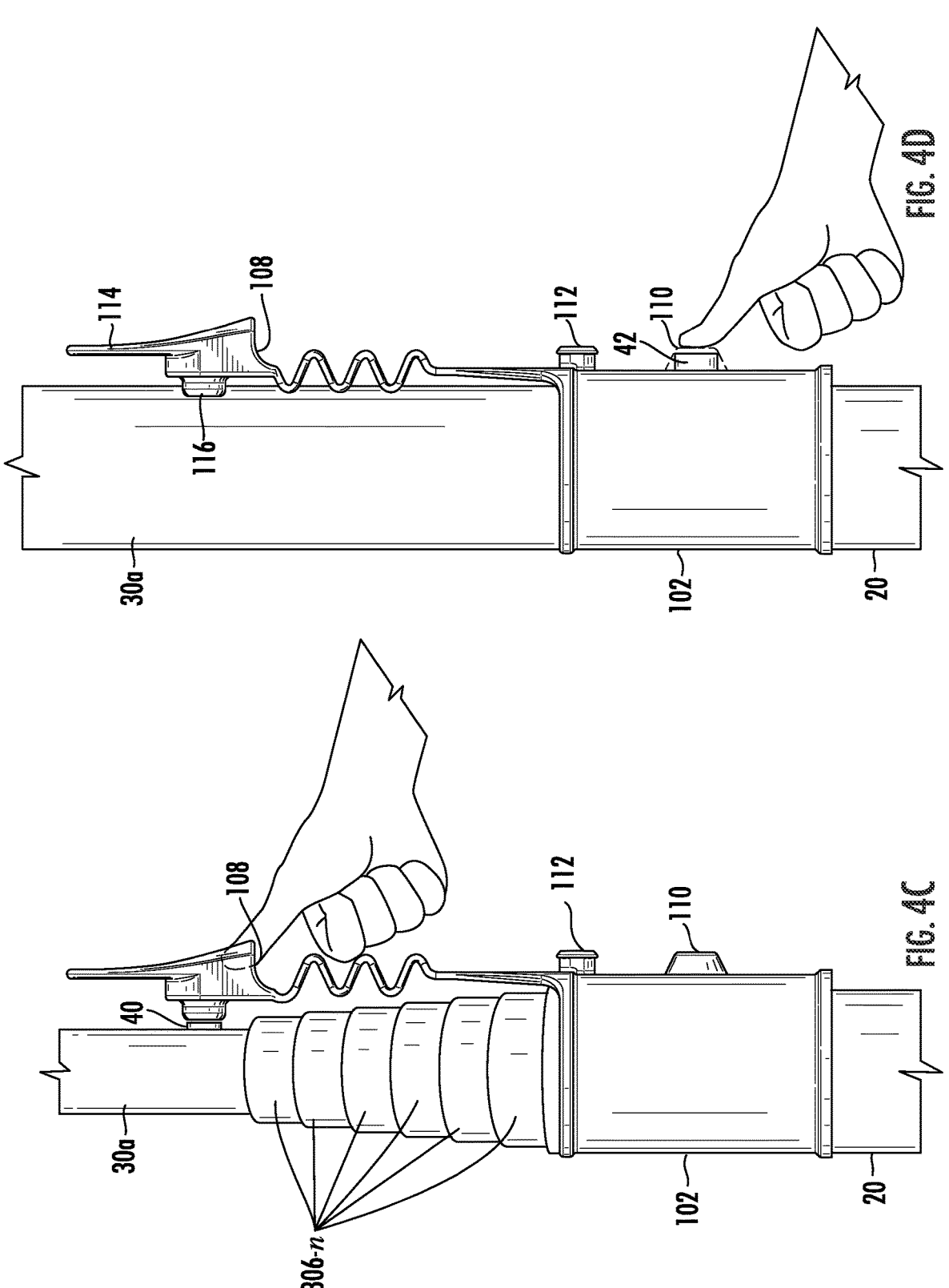

ANTI-PINCH COVER

CROSS-REFERENCE TO RELATED APPLICATIONS

This application claims priority pursuant to 35 U.S.C. 119(a) to Indian Application No. 202111039753, filed Sep. 2, 2021, which application is incorporated herein by reference in its entirety.

BACKGROUND

Telescopic hot sticks are insulating sticks designed for environment where long reach is needed with speed and safety. Telescopic hot sticks are used in various applications such as operating and disconnecting switches, replacing fuses on transformers, lifting earthing devices, installing personal protective grounds and load break tools, cleaning conductors, pruning trees etc. However, pinching of a hand/ glove while extending or retracting telescopic hot sticks is a common problem faced by the lineman whenever the lineman activates the telescopic hot stick. Through applied effort, ingenuity, and innovation, Applicant has solved problems relating to differential pressure sensors by developing solutions embodied in the present disclosure, which are described in detail below.

SUMMARY

Various embodiments described herein relate to apparatuses and systems for an anti-pinch cover.

In accordance with various examples of the present disclosure, an anti-pinch cover is provided. The anti-pinch cover includes a housing adapted to hold a telescopic hot stick; a button pocket protruding from the housing; and an extensible leg extending distally from the housing. The extensible leg includes a boss protruding from the extensible leg and a protector thimble formed on a distal end of the extensible leg opposite to the boss. The protector thimble is adapted to receive a user's finger.

In accordance with various examples of the present disclosure, a system is provided. The system includes a telescopic hot stick and an anti-pinch cover. The telescopic hot stick includes a primary arm that includes a first button for releasably engaging the primary arm and at least one secondary arm that include a second button for releasably engaging the at least one secondary arm. The anti-pinch cover includes a housing adapted to hold the primary arm of the telescopic hot stick, a button pocket protruding from the housing and configured to engage the first button; and an extensible leg extending distally from the housing. The extensible leg includes a boss protruding from the extensible leg that is configured to engage the second button and a protector thimble formed on a distal end of the extensible leg opposite to the boss. The protector thimble is adapted to receive a user's finger.

In accordance with various examples of the present disclosure, an anti-pinch cover is provided. The anti-pinch cover includes a housing, a button pocket protruding from the housing in a first direction, and an extensible leg extending from the housing in a second direction. In some examples, the , first direction is perpendicular to the second direction. The extensible leg comprises a protector thimble protruding from a distal end of the extensible leg in the first direction and a boss protruding from the extensible leg opposite to the protector thimble.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2b depicts a perspective side view of an anti-pinch cover, in accordance with example embodiments described herein.

FIG. 2c depicts a perspective rear view of an anti-pinch cover, in accordance with example embodiments described herein.

FIG. 4a-4d illustrates perspective views of the anti-pinch cover mounted on the telescopic hot stick, in accordance with some example embodiments described herein.

FIG. 4b illustrates another perspective view of the anti-pinch cover mounted on the telescopic hot stick, in accordance with some example embodiments described herein.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Telescopic hot sticks are used, in some examples, in a high voltage electrical environment and/or in environments where a long reach is needed to access a workpiece located at a remote location, such as on a power pole or the like. Telescopic hot sticks are typically constructed of a suitable dielectric material and include a tool holder a distal end. In some examples, the tool holder is adaptable to engage a wide array of different tools, wires, items, and/or the like.

Figure 1:
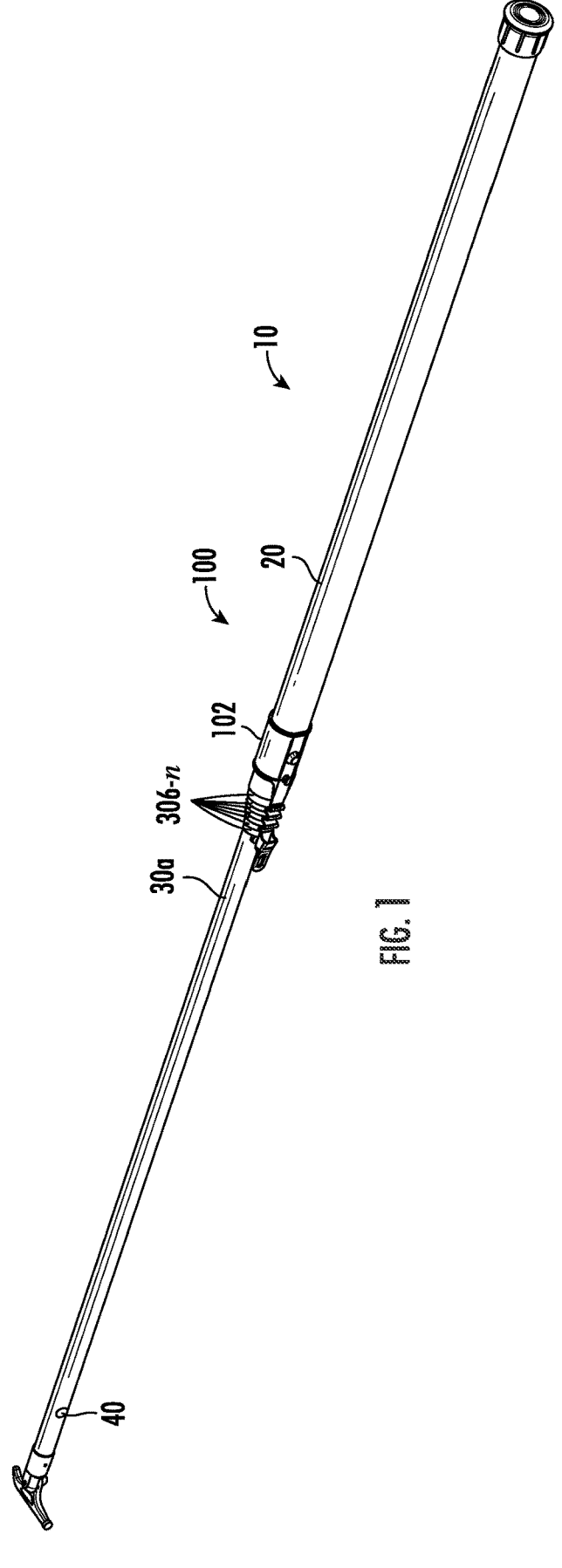
FIG. 1 illustrates a perspective view of telescopic hot stick with anti-pinch cover in operation, in accordance with example embodiments described herein.

FIG. 1 illustrates a perspective view of telescopic hot stick with anti-pinch cover 100. The telescopic hot stick 10 comprises an primary arm 20 and at least one secondary arm 30a-n. Secondary arm 30a is extended from the primary arm 20. Secondary arm 30a includes a second button 40. In an instance in which second button 40 is pressed, secondary arm 30a is released from its retracted position and can be extended or is released from its extended position and can be retracted.

Example embodiments of the telescopic hot stick include a predetermined number of similar length, secondary arms 30a-n engaged with one another so as to provide a variable length telescopic hot stick. The anti-pinch cover 100 is wrapped around the primary arm 20 in order to facilitate the user while performing anti-pinch extension or retraction of the at least one secondary arm 30a-n. More particularly, the anti-pinch cover 100 is adapted to release at least one secondary arm 30a-n based on an input from the user.

The primary arm 20 includes a first button for releasably engaging the primary arm 20. The telescopic hot stick also includes a primary arm assembly having a first arm with a first passage therethrough and a first release mechanism, the first release mechanism having a first button biased to extend at least partially through the first passage.

The at least one secondary arm 30a-n that include a second button for releasably engaging the at least one secondary arm 30a-n. The telescopic hot stick also includes a secondary arm assembly having a second arm with a second passage therethrough and a second release mechanism, the second release mechanism having a second button biased to extend at least partially through the second passage.

In some examples and in accordance with the embodiments described herein, a telescopic hot stick is constructed of multiple sections of secondary arms 30a-n which allow for the extension and retraction of the telescopic hot stick. In some examples and to prevent relative rotation between the sections of the hot stick, arms are formed with a predetermined non-circular cross-sectional shape. Preferably, this shape is substantially triangular so as to have three side surfaces with a convex arcuate corner portion disposed between each mutually adjacent pair of side surfaces. It should be recognized that other non-circular shapes may be used, so long as rotation of one section relative to an adjacent section is prevented and sliding engagement is permitted.

In one another embodiment, the cross-sectional shape is configurable such that it is uniform along the axial length of each arm to facilitate assembly and disassembly of the telescopic hot stick. In other words, no physical constructions are provided which would impede sliding engagement of adjacent sections.

In one another embodiment, the particular length of each arm and the total quantity of sections comprising each telescopic hot stick can vary depending upon the overall total length required for the telescopic hot stick. It should be recognized that any combination of lengths and quantity may be used to provide the desired length and satisfy the intended uses of the telescopic hot stick. In one another embodiment, it should be recognized that the intermediate arms between the end sections are provided with both the male end and the female end at opposing ends thereof. Each arm may be readily disengaged from a respective adjacent section to vary the overall length of the pole.

Various example embodiments described herein relate to an anti-pinch cover for a telescopic hot stick that can be designed to fit on any type of telescopic hot stick. The anti-pinch cover can be configured to perform particular operations or actions by virtue of having defined hardware structure which when installed on a telescopic hot stick causes or cause the system to perform the retraction actions of the hot stick without any injury or hazard. Moreover, at least a portion of the anti-pinch cover may be translucent so as to allow a user to see and interact with the buttons on the telescopic hot stick.

Figure 2A:
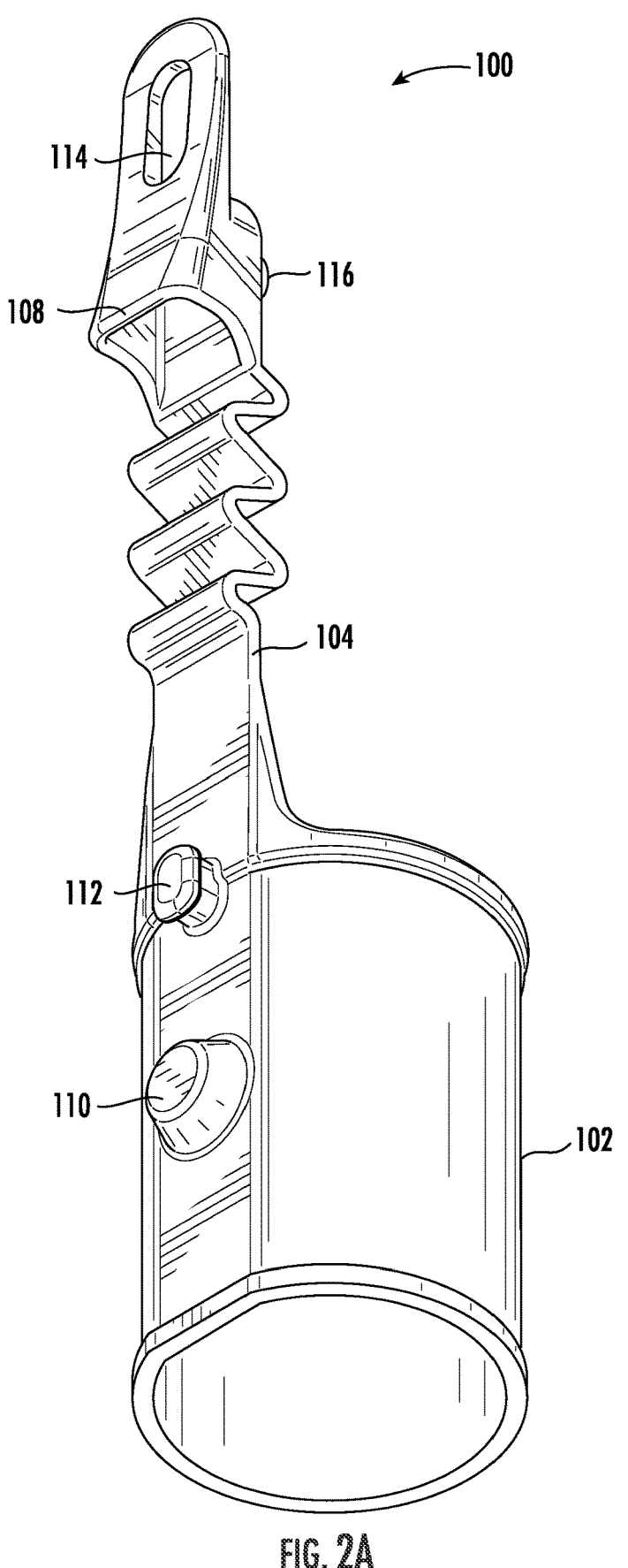
FIG. 2a depicts a perspective front view of an anti-pinch cover, in accordance with example embodiments described herein.

FIG. 2a depicts a perspective front view of an anti-pinch cover 100, in accordance with example embodiments described herein. In one example embodiment, the anti-pinch cover 100 includes a housing 102 adapted to hold the primary arm. In one exemplary embodiment, the housing is adapted to be fixed with the telescopic tube using one of a glue, adhesive, screw or combination thereof. In some examples, the housing and the extensible leg are elastomers and/or may be translucent.

In some examples, a button pocket 110 protrudes from the housing 102 and overlaps with a first button (not shown) of the telescopic hot stick, where the first button is adapted to receive an input via the button pocket 110; and an extensible leg 104 extending from one side of the housing 102. In some examples, the extensible leg 104 includes a boss 116 protruding from one end of the extensible leg 104, where the extensible leg 104 further extends from the boss 116 defining a retainer 114 having an opening; and a protector thimble 108 formed on the extensible leg 104 opposite to the boss 116, where the second button (not shown) is adapted to receive the user input via that protector thimble 108 for engaging subsequent secondary arms.

At least a portion of the extensible leg 104 is corrugated so at to allow the extensible leg 104 to be expanded and retracted based on a force. As such, the overall length of the extensible leg 104 can be changed, such as to accommodate a particular primary arm, to engage a tool head, or the like.

In one exemplary embodiment, the anti-pinch cover includes a hanger bracket 112 located on the one side of the housing 102. The extensible leg 104 is flexible so as to allow it to be bent from an extended position to a retracted position, whereby the retainer 114 is detachably attached to the hanger bracket 112 in the retracted position.

In one exemplary embodiment and in operation, the first button of the telescopic hot stick (not shown) is pushed via the button pocket 110 and the second button of the telescopic hot stick (not shown) is pushed via the boss 116 without pinching a finger of the user. The first and second buttons are part of the telescopic hot stick, in some examples. When pushed, the first and/or second buttons release the arms so as to allow for extension or retraction.

FIGS. 2b and 2c depict a perspective side view of the anti-pinch cover 100, in accordance with example embodiments described herein. In one example embodiment, the anti-pinch cover 100 includes a boss 116 in the form of a protrusion, extension, or the like. Boss 116 is positioned opposite to protector thimble 108. In some examples, the boss 116 is adapted to transfer a force applied by the user, via protector thimble 108, to the boss 116 such that the boss 116 can interact with or otherwise activate a button on at least one secondary arm of a telescopic hot stick. Alternatively or additionally, the boss 116 is adapted to contact with the locking assembly of a telescopic hot stick.

Figure 3:
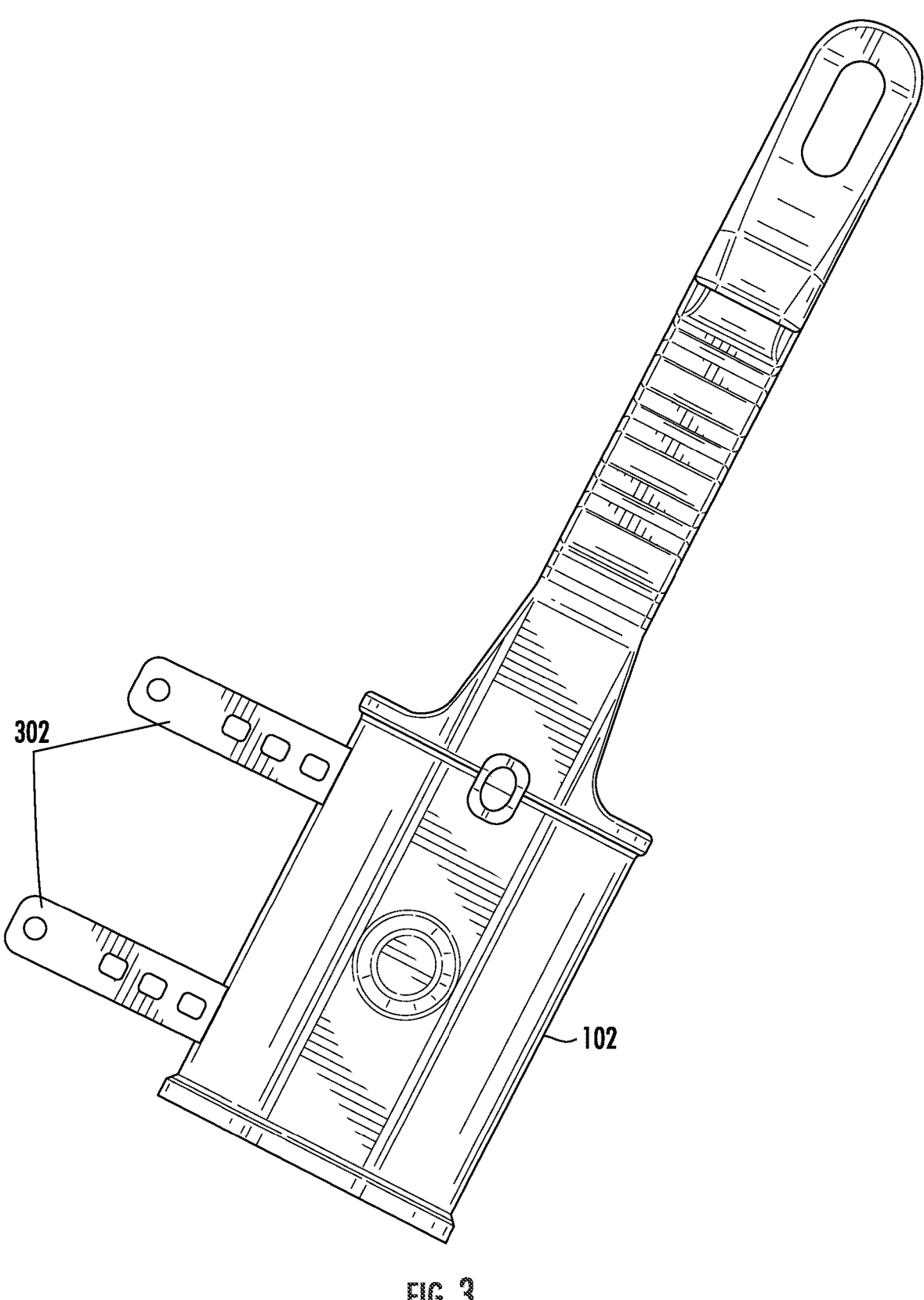
FIG. 3 depicts another perspective view of an anti-pinch cover in accordance with example embodiments described herein.

FIG. 3 depicts another perspective view of an anti-pinch cover 100, in accordance with example embodiments described herein. In an example embodiment, the housing 102 of the anti-pinch cover 100 further comprises a fastening unit 302. The fastening unit 302 fixes or otherwise couples the housing 102 to the telescopic hot stick. Fastening unit 302 includes a plurality of belts. Alternatively or additionally, the fastening unit includes at least one of a belt, screw, fastener, hook and loop mechanism, adhesive and/or the like.

Figures 4A, 4B:
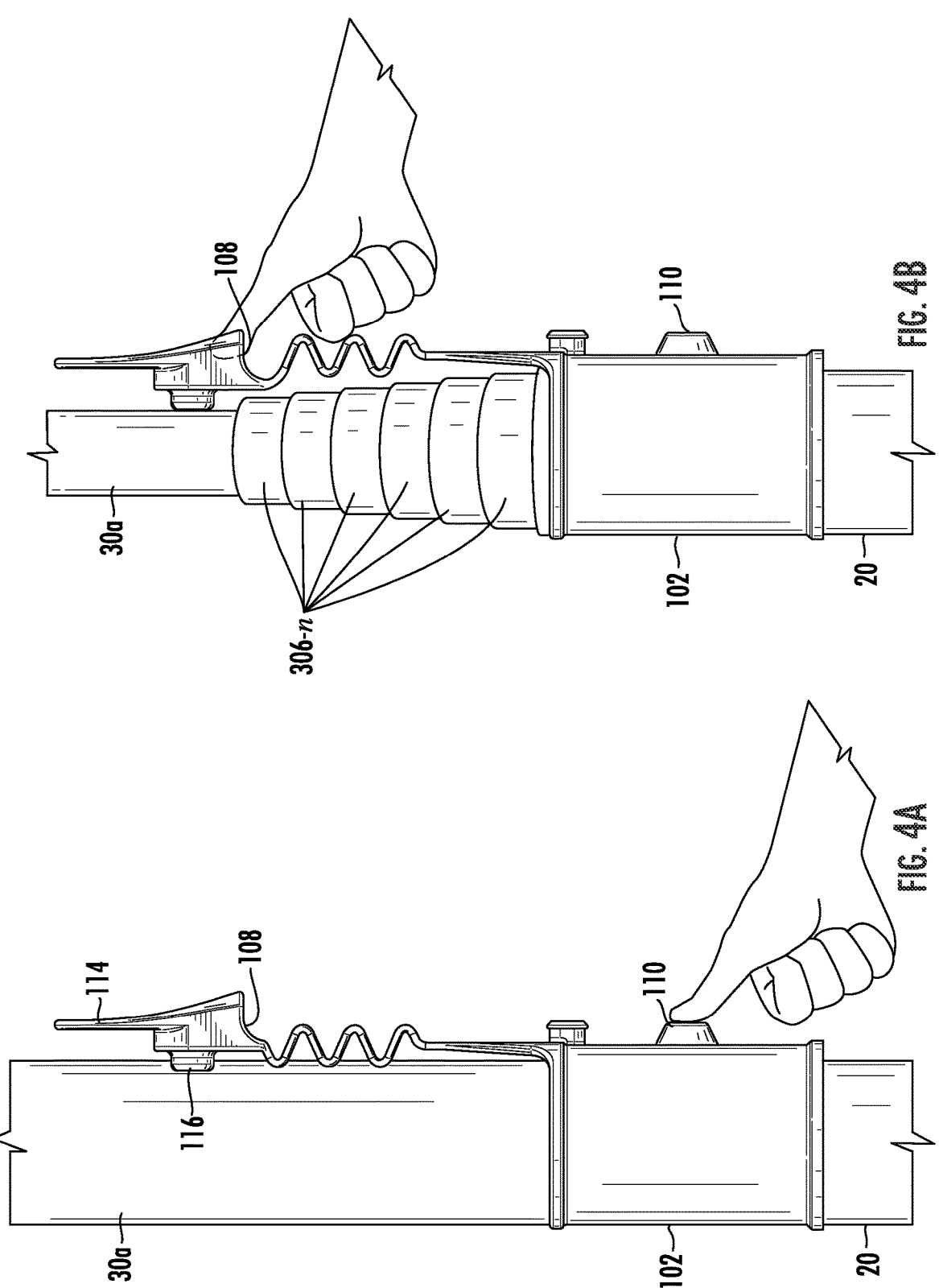

FIG. 4a illustrates a perspective view of the anti-pinch cover 100 mounted on the primary arm 20. In one embodiment, the anti-pinch cover 100 is mounted on the telescopic primary arm 20 via a fastening unit.

FIG. 4b illustrates a perspective view of the anti-pinch cover mounted on the primary arm 20 and extending toward secondary arm 30a. More particularly, to provide telescoping engagement of the secondary arms 30a-n the secondary arms 30a-n are provided with progressively decreasing cross-sectional dimensions as illustrated in FIG. 4b wherein the first secondary arm 30n has the largest cross-sectional dimension and last secondary arm 30a has the smallest cross-sectional dimension. The arms are tubular and have a close-fit slidingly engaged relation one with the other so that the sections will remain coaxial with little or no detectable relative movement therebetween when in the extended relation.

FIG. 4C illustrates a perspective view of the anti-pinch cover 100 mounted on the primary arm 20. In some examples and as described herein, a button pocket 110 protrudes from the housing 102 and overlaps with a first button 42 of the telescopic hot stick. In some examples and upon input via the button pack 110, a pushing forces is transferred to first button 42 so that the button is pushed or otherwise engaged. Engaging the first button 42 allows the secondary arms to unlock so that secondary arms 30a-n can be extended or retracted FIG. 4D illustrates a perspective view of the anti-pinch cover 100 mounted on the primary arm 20. In one embodiment, the boss 116 is adapted to make a contact with a second button 40 on the telescopic hot stick. As is discussed herein, the user is able to insert a finger into the protector thimble 108 and, by pressing towards the telescopic hot stick can urge the boss 116 into forcible contact with second button 40. The force applied by boss 16 activates second button 40 so as to allow the secondary arms to unlock so that secondary arms 30a-n can be extended or retracted.

Figure 5:
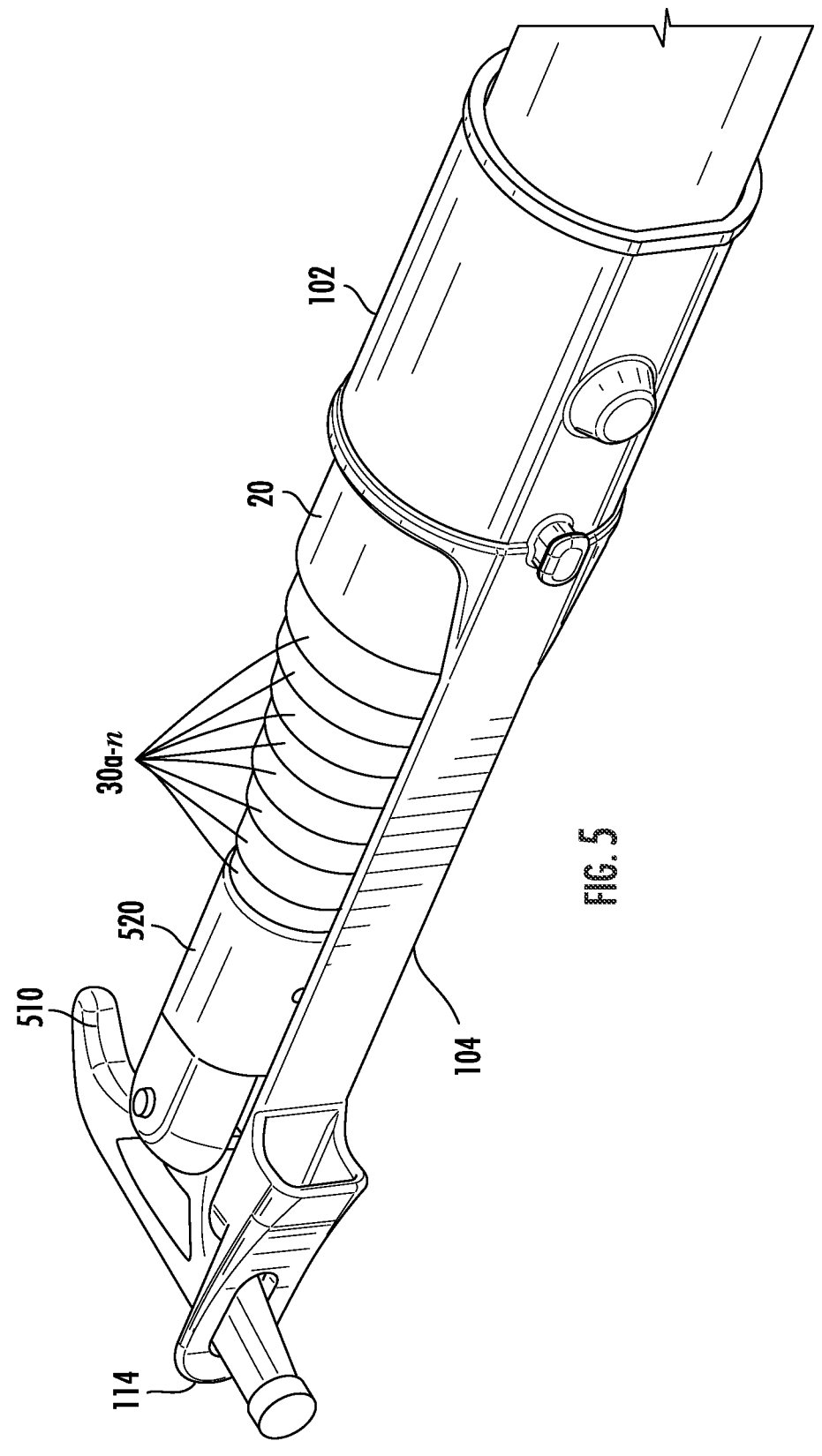
FIG. 5 depicts an anti-pinch cover holding a tool head, in accordance with some example embodiments described herein.
Figure 6:
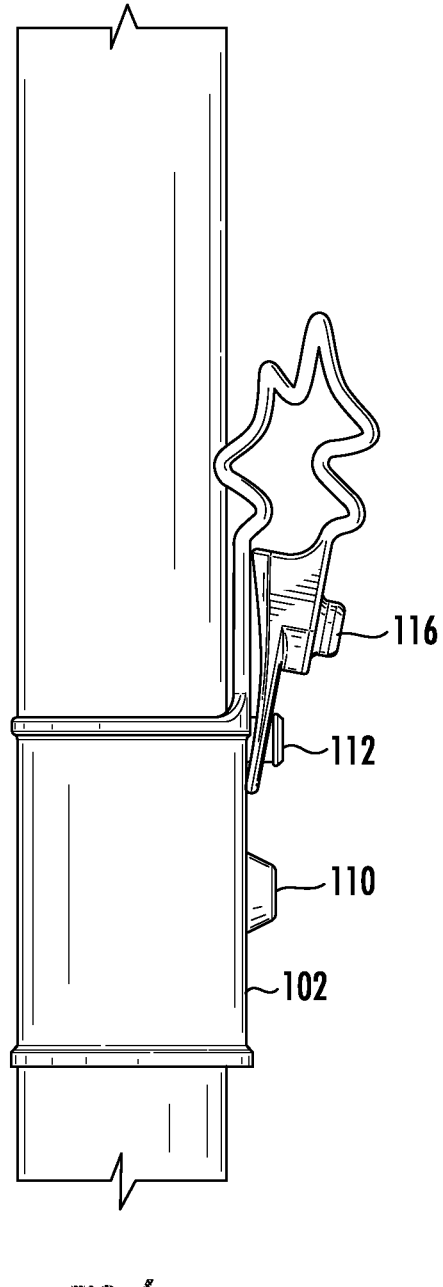
FIG. 6 depicts a perspective view of the anti-pinch cover mounted on the telescopic hot stick, in accordance with some example embodiments described herein.

FIG. 5 depicts a locking mechanism of an anti-pinch cover 100 in accordance with example embodiments disclosed herein. In one example embodiment, the distal end of secondary arm 30a is fitted with a channel 520 and a tool head 510 extending therefrom. As a result, the tool head 510 is at the distal end of the telescopic hot stick.

When the secondary arms 30a-n are in a full retracted position, extensible leg 104 is extendable so as to allow retainer 114 to engage the tool head 510. In some examples, the tool head 510 is configured to extend through an aperture defined by the retainer 114. In an instance in which the tool head 510 is engaged by the retainer 114, secondary arms 30a-n are secured and cannot be extended.

Various embodiments of an anti-pinch cover are described herein. One advantage of using the anti-pinch cover described herein, in some examples, is enhanced safety of the user as it enables the users to retract the sections of the hot stick without coming in direct contact with the buttons on the telescopic hot stick. In this way and in some examples, the pinching instances or any kind of similar instances can be minimized.

A further advantage of the anti-pinch cover, in some examples, is the retainer that is configured to hold the tool head and, thus, various arms in a locked or otherwise secured position during transportation or during idle mode. This enables a user to transport the telescopic hot stick just by locking the sections using elastic properties of the extensible leg of the anti-pinch cover. Accordingly, during transportation, no loose sections of the telescopic hot stick cause any kind of accident or injury to anyone.

Although a particular preferred embodiment of the invention has been disclosed in detail for illustrative purposes which is an improvement over known constructions, it will be recognized that variations or modifications of the disclosed apparatus of the invention, including the rearrangement of parts, lie within the scope of the present invention.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. An anti-pinch cover, comprising:
a housing adapted to hold an electrically insulative telescopic hot stick;
a button pocket protruding from the housing; and
an extensible leg extending distally from the housing, wherein the extensible leg comprises:
a boss protruding from the extensible leg; and
a protector thimble formed on a distal end of the extensible leg opposite to the boss, wherein the protector thimble is adapted to receive a user's finger.

2. The anti-pinch cover of claim 1 wherein the anti-pinch cover further comprises a hanger bracket that extends from the housing.

3. The anti-pinch cover of claim 2 wherein the extensible leg defines a retainer that is configured to be detachably attached to the hanger bracket.

4. The anti-pinch cover of claim 1, wherein a force applied to the protector thimble is transferred to the boss.

5. The anti-pinch cover of claim 1, wherein at least a portion of the anti-pinch cover is translucent.

6. The anti-pinch cover of claim 1, wherein the housing further comprises a fastening unit for fixing the housing over the telescopic hot stick, and wherein the fastening unit includes at least one of a belt or screw.

7. The anti-pinch cover of claim 1, wherein the housing is adapted to hold the telescopic hot stick using at least one of a glue, adhesive, screw or combination thereof.

8. A system comprising:
  an electrically insulative telescopic hot stick comprising a primary arm that includes a first button for releasably engaging the primary arm and at least one secondary arm that include a second button for releasably engaging the at least one secondary arm; and
  an anti-pinch cover comprising:
    a housing adapted to hold the primary arm of the telescopic hot stick;
    a button pocket protruding from the housing and configured to engage the first button; and
    an extensible leg extending distally from the housing, wherein the extensible leg comprises:
      a boss protruding from the extensible leg, wherein the boss is configured to engage the second button; and
      a protector thimble formed on a distal end of the extensible leg opposite to the boss, wherein the protector thimble is adapted to receive a user's finger.

9. The system of claim 8, wherein the anti-pinch cover further comprises a hanger bracket that extends from the housing.

10. The system of claim 9, wherein the extensible leg defines a retainer that is configured to be detachably attached to the hanger bracket.

11. The system of claim 8, wherein a force applied to the protector thimble is transferred to the boss.

12. The system of claim 8, wherein at least a portion of the anti-pinch cover is translucent.

13. The system of claim 8, wherein the housing further comprises a fastening unit for fixing the housing over the telescopic hot stick, and wherein the fastening unit includes at least one of a belt or screw.

14. The system of claim 8, wherein the housing is adapted to hold the primary arm of the telescopic hot stick using at least one of a glue, adhesive, screw or combination thereof.

15. The system of claim 8, wherein the first button is pushed via the button pocket and the second button is pushed via the boss.

16. The system of claim 8, wherein an input to the protector thimble is transferred to the boss so as to activate the second button.

17. The system of claim 8, wherein at least one of the housing and the extensible leg made of an elastomer.

18. A translucent anti-pinch cover, comprising:
  a housing;
  a button pocket protruding from the housing in a first direction; and
  an extensible leg extending distally from the housing in a second direction and extensible in the second direction, wherein the first direction is perpendicular to the second direction, wherein the extensible leg comprises:
    a protector thimble protruding from a distal end of the extensible leg in the first direction; and
    a boss protruding from the extensible leg opposite to the protector thimble.

19. The anti-pinch cover of claim 18 wherein the anti-pinch cover further comprises a hanger bracket that extends from the housing.

20. The anti-pinch cover of claim 18, wherein a force applied to the protector thimble is transferred to the boss.

* * * * *